United States Patent [19]

Kohler et al.

[11] Patent Number: 4,871,452

[45] Date of Patent: Oct. 3, 1989

[54] ON-BOARD WATER SUPPLY

[75] Inventors: Karl Kohler; Dirk V. Reith, both of Hamburg, Fed. Rep. of Germany

[73] Assignee: Messerschmitt-Boelkow-Blohm GmbH, Bremen, Fed. Rep. of Germany

[21] Appl. No.: 193,383

[22] Filed: May 12, 1988

[30] Foreign Application Priority Data

May 12, 1987 [DE] Fed. Rep. of Germany ....... 3715759

[51] Int. Cl.$^4$ ................................................ C02F 9/00
[52] U.S. Cl. ..................................... 210/167; 210/199; 210/202; 210/241; 210/257.1; 210/258; 210/266
[58] Field of Search ............... 210/167, 241, 199, 202, 210/257.1, 258, 266

[56] References Cited

U.S. PATENT DOCUMENTS 3,995,328 12/1976 Carolan et al. ..................... 210/167

Primary Examiner—Ivars Cintins
Attorney, Agent, or Firm—Ralf H. Siegemund

[57] ABSTRACT

Water supply in aircraft for on-board use in conjunction with water outlets in lavatories and a galley, includes a waste water tank connected to at least some of the waste discharge outlets on board of the aircraft; a water purifying plant connected to and receiving water from the waste water tank; and a fresh water tank having outlet means, connected at least to some of the water outlets, and having an inlet connected to said water purification plant, for receiving therefrom purified waste water; an additional tank for drinking water may be provided as well as a separate supply line therefrom leading to drinking water outlets on board of the aircraft.

2 Claims, 1 Drawing Sheet

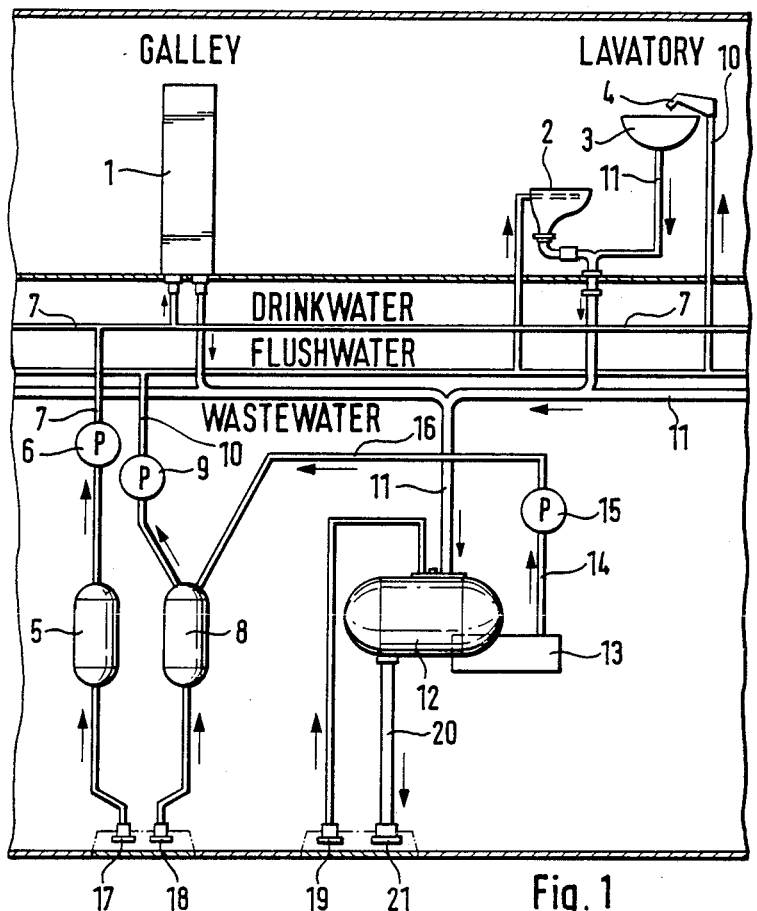
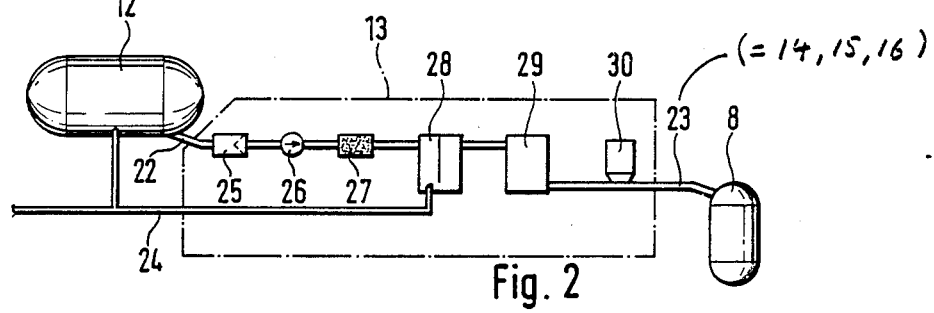

ON-BOARD WATER SUPPLY

BACKGROUND OF THE INVENTION

The present invention relates to a water supply system, particularly for use on board of an aircraft and including a plurality of taps generally, lavatories, the galley or the like, also including a potable or drink water tank as well as a waste water collecting and storage facility.

The known water supply for aircraft consists essentially in a common tank for potable water to which plural taps connect. In addition, there is a tank, as stated, for accumulating waste water, and there is a conduit system through which water, if necessary, is moved by means of pumps. Roughly, two-thirds of the potable water that is carried along originally is used up in the pantry or galley, as well as in lavatories, with direct discharge of any waste water into the appropriate tank. This waste water tank is provided only for receiving the residual third of the water that is used as flushing water in the toilets in lavatories. Such a water supply system is insufficient for covering a larger demand for water, such as a shower or the like. In such a case the water that is being carried along would become a prohibitively high load.

DESCRIPTION OF THE INVENTION

It is an object of the present invention to provide a new and improved water supply system for aircraft of the type referred to above and which is not subject to the limitations as outlined, whereby specifically larger volume uses are envisioned, including the taking of showers or the like on board of the aircraft. The quality of the water, of course, has to meet the usual rules.

In accordance with the preferred embodiment of the present invention, it is suggested to utilize a waste water tank and connect it to a device for recycling, purifying, and cleaning of waste water for that tank. That purified water is fed to a special frest water storage tank, and at least some of the on-board outlets and taps are connected to that tank such that the particular waste water passes through the water purification to be available again in any such particular tap, so that there is established a local circulation with a common branch or path portion that includes the storage tank, the waste water tanks, and on-board the purification plant. This particular tank could be separated from ordinary potable water in a still further tank.

DESCRIPTIONS OF THE DRAWINGS

While the specification concludes with claims particularly pointing-out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 is a somewhat schematic view of a water supply system in an aircraft; and FIG. 2 is a schematic view of the particular water purification portion and plant shown in FIG. 1.

Proceeding now to the detailed description of the drawings, a system is shown specifically for recirculating waste water to obtain, so to speak, a "usable" water supply, that is not necessarily used in the galley. The water supply system generally referred to here is provided in an aircraft and is to be used in the galley 1, in lavatories and toilets, with a toilet bowl 2, a washing basin 3, and a tap 4. In addition, a potable water tank 5 is provided which is connected to a potable water supply line 7, a pump 6, pumps drinking water from that tank 5 into the line conduit system 7. Analogously and in parallel thereto, there is a tank 8 which receives purified water. Water is being pumped from tank 8 by means of a pump 9, and into and through a conduit 10. Hence, there are three conduit systems, two supply systems 7 and 10, and a discharge system 11.

As shown in FIG. 2, the water for system 10 is derived from a purification plant 13 that feeds tank 8. The sinks of the galley 1 and the toilet 2 as well as the sink of the washing basin 3 all are manifolded to a waste water line 11 that leads to a waste water tank 12. The elements enclosed in dashed-out lines in FIG. 2, constitute a device 13 for water purification. This water purification device 13 is connected to the tank 8 through a suction line 14 and a pump 15 as well as a pressure line 16. The tanks 5, 8, and 12 connect to filling studs 17, 18, and 19 for connection and operation from the outside. This conduit/conveying system 14-15-16 is collectively denoted 23 in FIG. 2. A conduit 20 connects the waste water tank 12 with another stud 21. The device 13 is comprised, in essence, of several stages wherein the waste water is purified in several stages accordingly.

Prior to takeoff of an aircraft being equipped with a system as outlined above, the potable water tank 5 as well as tank 8 are both filled with potable water. The waste water tank 12 has been discharged through the stud 21. If desired, flushing may occur through the stud 19. Following take-off and during flight, the taps 4 (there being only one of them shown) are supplied with purified water through the conduit 10 under utilization of the operation of a pump 9. Analogously, potable water runs into the line 7 to the various taps in the galley 1, drinking fountains, etc.

As soon as waste water forms in the container 12 because of discharge from the various units to which the waste water tank is connected, water purification commences in and by operation of the device 13. The resulting purified water is pumped through the system line 23 (14-15-16) as purified water into the tank 8. Here, then, that water is available through the aforementioned taps, and involving particularly outlets for washing water, water for taking a shower, etc.

Concerning specifically the water that is purified on board, there is an established circulation involving the tank 8, the particular taps, the tank 12, and the purifier 13. Water circulated here gradually increases in quantity owing to the use from the galley. This means that the water regarded in the past as waste water and which was no longer used, is now made available for certain purposes so that the overall amount of water that has to be carried along is reduced.

A modification of such a device is to be seen in that device 13 operates in individual stages and is, in fact, supplemented and constructed to provide pure, potable water. This, of course, is a further advantage for reducing the overall weight such that a single tank, e.g. tank 8, suffices. Tank 5 is no longer necessary, without having to enlarge tank 81. Also, one of the conduit systems 7 and 10 is now superfluous. There is only a single quality of water.

A particular advantage of the device as described is to be seen in that prior to take-off the amount of water that is to be loaded is, in fact, relatively small. That, in turn, means that instead of water one can add passengers. Alternatively, it may now be possible for passengers to take a shower, which in the past simply was a prohibitive waste of water.

FIG. 2 illustrates in greater detail the purification device 13 as it is connected to the waste water tank 12, the connection involving primarily a conduit 22. There are additional conduits 23 and 24 for and providing connection to the tank 8. Through additional conduits 23 and 24, the device 13 is connected to the storage tank 8 as well as to an ozone generator which is not whown in detail.

Device 13 is constructed in that water entering through conduit 22 passes in sequence the following units and purification stages. First of all, there is a mechanical filter 25 to remove relatively coarse particles, particularly to keep these particles from the pump 26. Downstream from the pump 26 is provided a carbon filter 27, including a bed of active carbon, and downstream from that is provided an ozone stage 28 followed by an osmotic stage 29 and a disinfecting stage 30.

FIG. 2 shows, moreover, that ozone is also fed into the waste water tank 12 directly through the conduit 24. In other words, the waste water tank 12 is so to speak a first stage so that, in fact, 28 is a second stage for ozone adding. That kind of function and the operation of the respective units may be modified, as far as the water treatment is concerned, because there may be conditions which require such modification. Nevertheless, the various effects produced by the various units should all be provided for in one form or another and are, in fact, known from water purification. Nevertheless, they should be summarized here as follows:

The mechanical filter 25 removes primarily suspension, dust particles and the like. Active carbon is used in water purificaiton for a variety of reasons. For example, certain contaminants and materials solved in water are being bonded in some form or another to this carbon. In addition, carbon adsorbs large amounts of contaminants such as insecticides, water tension reducing materials, and so forth. Also carbon favors the decompositioning of certain contaminants by means of bacteria and acts in some instances as a catalyst, for example, in the case of chlorine compounds, so that the respective contaminants are removed from the water on that basis.

The ozone treatment is primarily biological in nature in that many microorganisms, such as bacteria and virus, are eliminated by the ozone. Also, certain flavoring materials, incense or the like, as well as other organic materials such as phenol are removed or decomposed by the ozone. Also, basic elements like iron, manganese, and sulfur are removed by the treatment with ozone, while, on the other hand, in a quite desirable to increase the oxygen concentration in the water.

The osmosis stage 29 uses particularly the so- called inverse osmosis. Here the water is forced against the osmotic pressure through the molecular texture of a semipermeable membrane. Owing to this particular effect only water can pass through that membrane so that indeed pure water is collected downstream from that membrane. In the case the ozone supply is insufficient, algae or other deposits may form in the respective conduits. In order to avoid this undesirable effect, disinfection may be used to add a very small amount of chlorine to the water. Another feature is to include irradiating the water with ultraviolet light or even evaporation with subsequent condensation. Unfortunately the irradiation with ultraviolet light is a very expensive one in terms of equipment and the evaporation and recondensation requires high amounts of energy are therefore not desirable. However, the invention is not limited to configurations of the type mentioned, particularly as far as the accumulation of various method steps for water purification are concerned, but additional steps, including any other conceivable water treatment that is practical on board, can be used.

Thus, the invention is not limited to the embodiments described above, but all changes and modifications thereof, not constituting departures from the spirit and scope of the invention are intended to be included.

We claim:

1. Water supply in aircraft for on-board use in conjunction with water outlets in lavatories and a galley, comprising:
    a waste water tank connected to at least some of the waste discharge outlets on board of the aircraft;
    a water purifying plant connected to and receiving water from the waste water tank;
    a fresh water tank having outlet means, connected at least to some of the water outlets and having an inlet connected to said water purification plant, for receiving therefrom purified waste water; and
    said water purifying plant including a mechanical filter, a pump, a carbon filter, an ozone stage, an osmosis stage and a disinfecting stage, all these components connected in series in the stated sequence, from the waste water tank to the fresh water tank, so that potable water be received by the fresh water tank from the purifying plant.

2. Water supply as in claim 1, inlcuding an additional tank for drinking water, and a separate supply line therefrom leading to drinking water outlets on board of the aircraft.

* * * * *